United States Patent [19]

Kelleher et al.

[11] 4,048,287

[45] Sept. 13, 1977

[54] SULFUR RECOVERY METHOD

[75] Inventors: Raymond L. Kelleher; Ivan A. Shirk, both of Spokane, Wash.; Timothy J. O'Leary, deceased, late of Spokane, Wash.

[73] Assignee: The Corporation of Gonzaga University, Spokane, Wash.

[21] Appl. No.: 605,330

[22] Filed: Aug. 18, 1975

Related U.S. Application Data

[63] Continuation of Ser. No. 429,280, Dec. 28, 1973, abandoned, which is a continuation of Ser. No. 157,951, June 29, 1971, abandoned, which is a continuation-in-part of Ser. No. 788,460, Jan. 2, 1969, abandoned.

[51] Int. Cl.² .................................................. C01B 17/60
[52] U.S. Cl. .................................. 423/242; 423/512 R
[58] Field of Search ...................... 423/242, 512; 55/73

[56] References Cited

U.S. PATENT DOCUMENTS

| | | | |
|---|---|---|---|
| 829,765 | 8/1906 | Carpenter | 55/73 |
| 1,046,915 | 12/1912 | Wedge | 55/73 |
| 1,262,295 | 4/1918 | Young | 423/242 |
| 1,821,064 | 9/1931 | Skogmark et al. | 55/73 |
| 2,013,753 | 10/1935 | Hahn | 55/73 |
| 2,113,198 | 4/1938 | Nonhebel et al. | 423/242 |

*Primary Examiner*—G. O. Peters
*Attorney, Agent, or Firm*—Graybeal, Barnard & Uhlir

[57] ABSTRACT

Sulfur recovery from smelter and like exhaust gases by regfrigerating the exhaust gases and removal of most of the contained water and $SO_2$ as a liquid phase, the removal being by liquid spray scrubbing, utilizing previously recovered water, after $SO_2$ removal therefrom, as the scrubbing liquid. Single or plural stages of refrigeration and liquid phase separation can be employed. The $SO_2$ is removed by combining thereof with the cool scrubbing water and is recovered by chemical treatment to neutralize and precipitate such as a sulfite salt.

4 Claims, 1 Drawing Figure

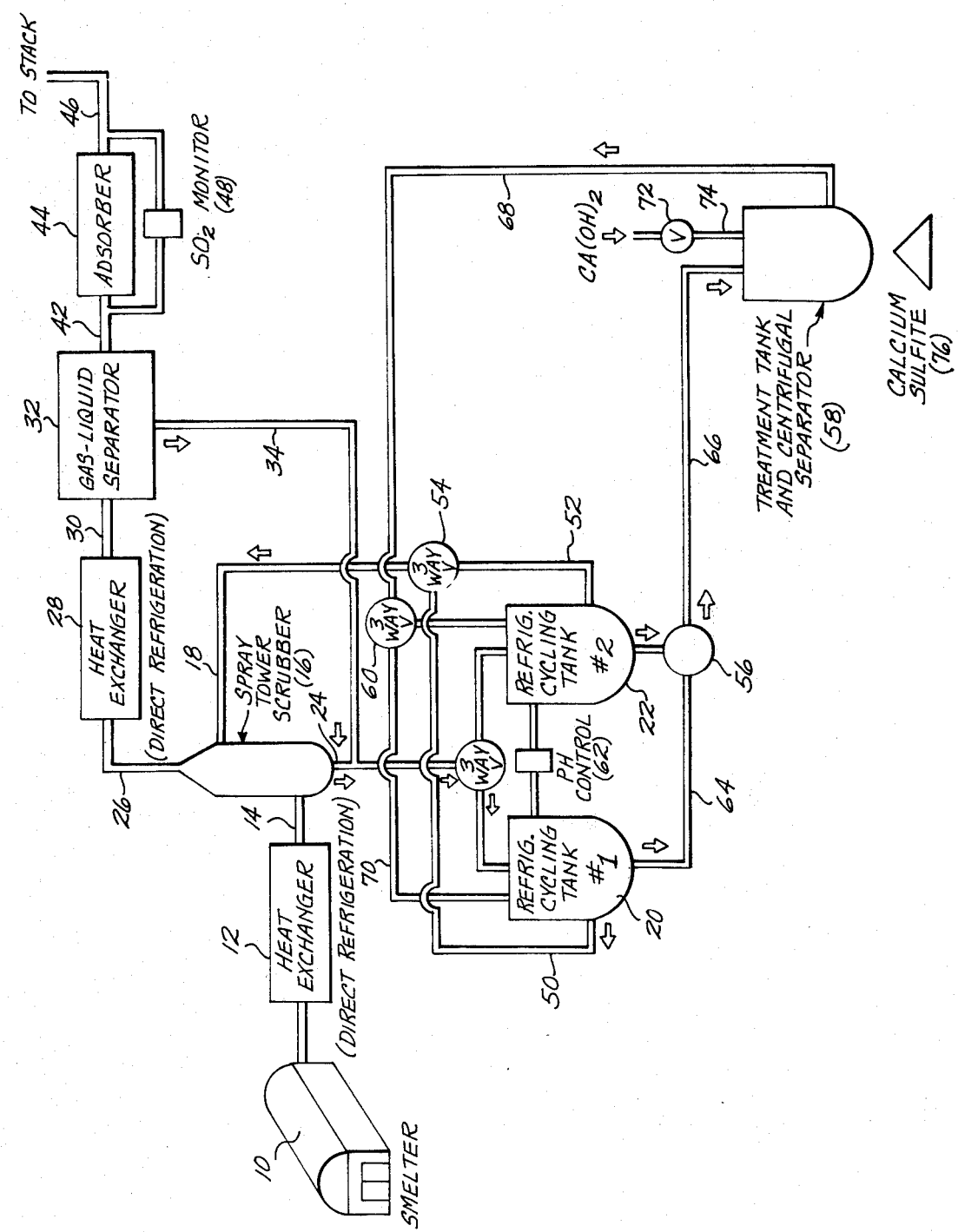

SULFUR RECOVERY METHOD

CROSS REFERENCE TO RELATED APPLICATIONS

This application is a continuation of our application Ser. No. 429,280, filed Dec. 28, 1973, now abandoned which is in turn a continuation of our application Ser. No. 157,951, filed June 29, 1971, now abandoned and which is in turn a continuation-in-part of our now abandoned application Ser. No. 788,460, entitled Method for Removing Pollutants From Industrial Exhaust Gases And The Like, filed Jan. 2, 1969.

Our related application Ser. No. 157,952, entitled Method For Removing Pollutants From Combustion Products Generated By Hydrocarbon Fuel Combustion And System Therefor, also filed on June 29, 1971, as a continuation-in-part of said application 788,460, is now U.S. Pat. No. 3,905,784, granted Sept. 16, 1975.

BACKGROUND OF THE INVENTION

1. Field of the Invention

This invention relates to a method of $SO_2$ removal and recovery as a sulfite salt from ore smelter and like exhaust gases, by refrigeration and water scrubbing of the cooled exhaust gases, the $SO_2$ removal being in liquid phase as a solute in the scrubbing water.

2. Description of the Prior Art

Hasche U.S. Pat. No. 1,810,312 discloses a system for recovery of sulfur dioxide from smelter furnace gases by refrigeration and liquefaction under pressure. The Hasche system separates sulfur dioxide from the smelter gaseous effluent by anhydrous liquefaction of the sulfur dioxide at about $-70°$ C. and about 15 atmospheres pressure, the use of pressurization in the system being to reduce the refrigeration requirement dictated by the necessity for anhydrous sulfur dioxide liquefaction. In contrast, the treatment process of the present invention operates at substantially atmospheric pressure and the sulfur dioxide present in the smelter furnace products of combustion is removed in the form of sulphurous acid, i.e. by taking advantage of the water solubility of sulfur dioxide in the refrigerated scrubbing water. In the Hasche system the water vapor is removed prior to the sulfur dioxide liquefaction, ie.e. the sulfur dioxide in liquid phase appears in this system under essentially anhydrous conditions because the refrigeration necessary for the sulfur dioxide liquefaction is at a temperature ($-70°$ C.) far below the freezing temperature of water.

SUMMARY OF THE INVENTION

In general, practice of the present invention involves treatment of $SO_2$ containing smelter and like exhaust gases to maximize recovery of the sulfur content thereof by refrigerating the exhaust gases, suitably to about $40°$-$60°$ F. at substantially atmospheric pressure, then liquid spray scrubbing the gases at like temperature and pressure to remove most of the $SO_2$ content of the gases as a solute in the cool spray water, the organization of the system being such that the spray water is water from which the $SO_2$ content has been previously removed. One refinement of the system involves further refrigeration of the gaseous effluent from the scrubbing stage, suitably to a temperature of about $35°$ F., to avoid loss of $SO_2$ from liquid phase in the event of uneven temperature areas in the gas flow path downstream of the scrubber, and to recover any scrubbing water carried over from the scrubbing tower. Incident to such scrubbing and further cooling stages any water soluble pollutants present in the gaseous effluent are for the most part also removed, such as oxides of nitrogen and the like, so that the resulting gases can be discharged to the atmosphere without introducing substantial pollutants to the atmosphere, one additional treatment of the gases in this respect to further improve the properties of the gases in terms of being pollutant-free being to subject the gases to an adsorber means such as a molecular sieve, wherein water insoluble pollutants such arsine ($A_sH_s$) are removed.

In a typical system the recovery of the $SO_2$ from the scrubbing water proceeds batch-wise with plural cycling tanks being alternately communicated in recycle flow with the spray scrubber and then in recycle flow with a treatment tank and centrifugal or like separator with a sulfite precipitating reagent such as calcium hydroxide added to the liquid, the operation being such that even though the $SO_2$ recovery proceeds batch-wise the delivery of scrubbing liquid to the scrubber proceeds on an essentially continuous basis. $SO_2$ recovery by the scrubbing water is monitored as by a pH monitor so that interruption of the use of a given batch of scrubbing water occurs at a time when the $SO_2$ content of the scrubbing water is near but short of the maximum solubility of $SO_2$ in the cool scrubbing water, the important consideration in this respect being that the $SO_2$ in the scrubbing cycle is maintained in liquid form, i.e. as a solute in the scrubbing water, and not in solid form.

A significant advantage of the process of the present invention is that the processing to remove and recover $SO_2$ from the smelter or like exhaust gases proceeds throughout at essentially ambient pressure, and the cooling of the gas and liquid phases involves markedly less refrigeration than heretofore considered necessary, the extent of refrigeration being at all times to temperatures above the freezing temperature of water.

DESCRIPTION OF THE DRAWINGS

The accompanying drawing schematically portrays an application of the present invention to treatment of smelter or like effluent gas to remove $SO_2$ therefrom, with a first stage of cooling and with a scrubbing stage substantially continuously receiving recycled scrubbing water alternately from one of two cycling tanks, with a subsequent stage of further cooling and $SO_2$ removed from the gas, and with adsorber treatment of the resulting effluent gas, the extraction of $SO_2$ from the liquid in the cycling tanks being by precipitation and separation thereof in a treatment tank and centrifugal separator, with return of the stripped cool liquid to heat exchange relationship with the smelter gas.

DESCRIPTION OF THE PREFERRED EMBODIMENTS

As is shown in the accompanying drawing, the typical system characteristic of the present invention includes an $SO_2$ source such as a conventional smelter furnace 10, wherein the hot gases from smelting of sulfur containing ore are typically comprising about 2-10% $SO_2$ or more, with the gases being discharged from the furnace at a temperature of about $220°$ F., for example. The hot, $SO_2$-rich exhaust gases are passed from the smelter 10 to refrigerated heat exchanger 12, either directly or through an electrostatic precipitator (not shown) where it is necessary or desirable to remove arsenic and like colloidal particles from the smelter effluent. Refrigerated heat exchanger 12 is suitably of a construction conventional per se in which refrigerated water is recycled in counterflow relation to the gas flow through the heat exchanger, it being understood the cooling medium is cooled to an appropriate temperature slightly above the freezing temperature of water, e.g. about 35° F. prior to circulation through the heat exchanger 12. The cool gases appearing in conduit 14 as outflow from the heat exchanger 12 are suitably at about 40°-60° F., and these cool gases are delivered to spray tower scrubber 16, conventional per se, in which the gases are scrubbed by water sprays utilizing a water input through conduit 18 from a selected refrigerated cycling tank No. 1 (designated 20) or refrigerated cycling tank No. 2 (designated 22), as discussed more fully below. The liquid outflow through conduit 24 from the scrubber 16 is delivered as the input to a selected cycling tank 20 or 22, also as discussed more fully below, and the gaseous outflow appearing in conduit 26 from the scrubber 16 is led to a second heat exchanger 28 where condensation of any carryover water occurs, the heat exchanger 28 being also of a type conventional per se and directly refrigerated to about 25° F., the temperature of the gaseous effluent leaving the heat exchanger 28 in conduit 30 being about 35° F. The liquid condensate in the outflow from heat exchanger 28 is separated from the essentially dry gaseous constituents thereof in gas-liquid separator 32, which is also of a type conventional per se and suitably includes baffling to promote aqueous separation.

Selected cycling tank 20 or 22 receives the liquid discharge from the gas-liquid separator 32 through conduit 34. The particular tank selected is determined by the setting of three-way valve 36 delivering the combined scrubber outflow in conduit 24 and separator outflow in conduit 34 to either tank 20 through conduit 38 through conduit 40. The gaseous effluent from the gas-liquid separator 32 is passed through conduit 42 to adsorber means 44 such as one or more sequentially used molecular sieves functioning to remove water insoluble constituents such as arsine, following which the gaseous outflow is passed through conduit 46 to the flue stack. An $SO_2$ monitor 48 is arranged in parallel flow with the adsorber means 44 to monitor the $SO_2$ content of the gases outflowing from gas-liquid separator 32 and to provide indication of any abnormally high level of $SO_2$ in this gaseous effluent, an abnormally high level of $SO_2$ being symptomatic of system malfunction.

$SO_2$ is removed from the smelter exhaust gases as a water soluble solute in the low temperature scrubber 16. The extreme cooling and pressurization of the gases characteristic of certain prior $SO_2$ recovery systems are thus avoided. $SO_2$ recovery from the aqueous phase outflow from the scrubber 16 and gas-liquid separator 32 occurs in the following manner. Three-way valve 36 communicates the outflow from scrubber 16 and separator 32 with the selected refrigerated cycling tank 20 or 22. Water outflow from the respective tanks 20 or 22, appearing in respective conduits 50 or 52, is communicated to the scrubber water inflow conduit 18 through three-way valve 54, and three-way valve 56 passes the product outflow from the tanks 20 and 22 to the treatment tank and centrifugal separator 58. Additionally, three-way valve 60 communicates the liquid outflow from separator 58 to either of the tanks 20 and 22.

As will be apparent, operation of the cycling tanks 20 and 22 is batch-wise. Assuming the circumstances where the valves 36, 54, 56 and 60 are set to communicate tank 20 with the scrubber 16, the outflow from scrubber 16 and separator 32 passes to tank 20 through conduit 38. This outflow, containing $SO_2$ as a solute in aqueous solution, which liquid phase is also describable as a weak sulfurous acid ($H_2SO_3$) solution, is recycled through the tank 20 and the scrubber 16, the sequence of flow being into the top of the tank 20, out the bottom of the tank 20 through conduit 50, valve 54, conduit 18 and into the top of the scrubber 16, then out of the scrubber 16 through conduit 24 and back into the tank 20 through valve 36 through valve 36 and conduit 38. Such recycling continues until the pH monitor 62 on the tank indicates presence of a predetermined level of $SO_2$ content (actually measured as $H^+$ ion concentration corresponding to a given $SO_3^-$ ion concentration). Determination of acceptable $SO_2$ content and the pH corresponding thereto is on the basis of the maximum solubility of the $SO_2$ in the water at the tank temperature (suitably about 35° F.), the controlling consideration in this respect being that the maximum tolerable $SO_2$ content is necessarily determined by the solubility of the $SO_2$ and the fact that evolution of $SO_2$ gas in the cycling tank is to be avoided. As will be understood the tank 20 and its corresponding tank 22 are suitably refrigerated as by refrigeration coils (not shown) in the tank shell and temperature is maintained substantially uniformly in each tank by suitable means such as agitators (not shown), in a manner conventional per se.

At such time as the $SO_2$ containing water recycling through the cycling tank 20 and scrubber 16 reaches the predetermined pH indicative of the $SO_2$ content approaching maximum solubility thereof in the water, then the three-way valves 26 and 54 are shifted to place cycling tank 22 on stream and tank 20 off stream and the recycling then proceeds through tank 22 and scrubber 16. With tank 20 off stream the $SO_2$ containing water in tank 20 is cycled from tank 20 through conduit 64, three-way valve 56 and conduit 66 to the treatment tank and centrifugal separator 58. Simultaneously with the delivery to separator tank 58 a predetermined amount of calcium hydroxide is metered into the tank 58 through valve 72 and conduit 74, the amount of calcium hydroxide introduced being determined on the basis of the amount necessary to substantially stoichiometrically neutralize the $SO_2$ content. As will be understood, the calcium hydroxide removes the $SO_2$ content of the liquid, precipitating such as calcium sulfite, the precipitated calcium sulfite being removed from the liquid in separator tank 58 and recovered in solid form as indicated at 76. With the $SO_2$ essentially removed from the liquid, the liquid is essentially $SO_2$-free, or what may be termed desulphitized, and in a condition for further recycling to the scrubber 16 and is returned to tank 20 through conduit 68, three-way valve 60 and conduit 70.

If substantial amounts of soluble salts are formed by the calcium hydroxide addition to the liquid in tank 58, such as calcium nitrate and calcium nitrite, such soluble salts can be removed from the treated liquids prior to return of liquid to cycling tank 20 or 22, as by passage of the treated liquid through cation and anion exchange beds (not shown) placed in return conduit 68.

At such time as the liquid in cycling tank 22 has accumulated sufficient $SO_2$ content from its being recycled through the scrubber 16 and from the condensate supplied to it from the gas-liquid separator 32 to approach the pH level indicative of maximal $SO_2$ content short of $SO_2$ gas evolution, as determined by pH monitor 62, then the three-way valves 36, 54, 56 and 60 are shifted to again place cycling tank 20 in recycle communication with scrubber 16 and to place cycling tank 22 in communication with the separator 58, and the SO$_2$ content of the liquid in the tank 22 is delivered to the tank 58 and the SO$_2$ content thereof precipitated by addition of the appropriate stoichiometric amount of calcium hydroxide, with the precipitated calcium sulfite being removed from this batch of the liquid. As will be apparent, the batch-wise recirculation of liquid from a given cycling tank through the scrubber to pick up SO$_2$ and the subsequent removal of the SO$_2$ from the liquid in tank 58 while the liquid in the other cycling tank is being recycled to the scrubber, can proceed with each tank in each recycling stream consecutively and alternately, the removal of SO$_2$ content from the smelter exhaust gases nonetheless proceeding on a continuous basis in scrubber 16 and separator 32.

As will be understood, the reversal of condition of the various valves 36, 54, 56 and 60 and the actuation of valve 74 to deliver the stoichiometrically desired amount of precipitating reagent to the separator tank 58, can be rendered automatically responsive to the sensing by pH monitor 62 of the substantially SO$_2$ saturated condition of the liquid in a given tank then on stream with the scrubber 16, i.e. the batch-wise sequencing of the cycling tanks 20 and 22 can be automatically controlled responsive to the pH monitor by employment of control circuitry known per se.

Our aforesaid U.S. Pat. No. 3,905,784 discloses a system and process for treating industrial gases such as are generated by combustion of hydrocarbon fuels to maximize removal of both water soluble and water insoluble pollutants from the gases prior to discharge thereof to the atmosphere. The invention disclosed and claimed in such companion application bears a close similarity to the subject matter of the present invention in the sense that it similarly employs one or several stages of cooling and refrigeration of the combustion products, with attendant separation of the water and water soluble constituents by condensation of the water with the water soluble constituents being removed as solutes in the condensed water, and with subsequent treatment of the liquid phase to precipitate or extract the water solubles. As will be recognized from a comparison of these companion disclosures, the processing procedures and certain equipments disclosed in said ompanion application for maximizing separation and recovery of various water soluble constituents such as oxides of nitrogen, hydrogen sulfide, formaldehyde, formic acid, quinoline type bases and pyridine type bases from industrial combustion products can be applied as well to the maximizing of water soluble constituent removal in the processing and system disclosed in this application, if maximal pollution control is desired, and the applicable disclosure of said companion application in these respects is to be considered as a part of the disclosure of this application and is hereby incorporated by reference.

What is claimed is:

1. In the method of removing sulfur dioxide (SO$_2$) from the exhaust gases of a sulfide ore smelter or the like, wherein the exhaust gases contain at least about 2% SO$_2$ and are subjected to liquid spray scrubbing on a continuous basis in scrubbing tower means at essentially ambient pressure to remove SO$_2$ prior to discharge of the gases to the atmosphere and wherein the scrubbing liquid outflow from the scrubbing tower means is processed to remove the SO$_2$ and at least in part recycled through the scrubbing tower means, the improvements in said method comprising:

a. by refrigeration, cooling the exhaust gases to a temperature of about 40°–60° F. prior to introduction thereof to said scrubbing tower means;
   b. by refrigeration, cooling the scrubbing liquid recycled through said scrubbing tower means so that it is also at a temperature of about 40°–60° F. during contact thereof with the exhaust gases;
   c. recycling the scrubbing liquid from one cycling tank to said scrubbing lower means, while simultaneously passing scrubbing liquid previously collected in another cycling tank to a solid sulfite separation state wherein lime is added to the scrubbing liquid in substantially stoichiometric proportion to precipitate and remove essentially all of the SO$_2$ content from the liquid as calcium sulphite, and returning the desulphitized liquid to such other cycling tank;
   d. interrupting the recycling of the scrubbing liquid from the one cycling tank to the scrubbing tower means at a time when the SO$_2$ content thereof is still at a concentration substantially less than the saturation concentration thereof in the scrubbing liquid so that no SO$_2$ containing precipitate is present in the scrubbing tower means, and initiating the recycling of desulphitized scrubbing liquid to said scrubbing tower means from another cycling tank;
   e. interrupting the recycling of the scrubbing liquid from such other cycling tank to the scrubbing tower means at a time when the SO$_2$ content thereof is still at concentration substantially less than the saturation concentration thereof in the scrubbing liquid so that no SO$_2$ containing precipitate is present in the scrubbing tower means; and
   f. desulphitizing the scrubbing liquid in such other cycling tank in like manner as in step (c) while recycling desulphitized scrubbing liquid from the one cycling tank to the scrubbing tower means, and so on, cyclically;

the spray scrubbing of the exhaust gases being thereby carried out on a continuous basis at low temperature and without any SO$_2$ containing precipitate being present in the scrubbing tower means, while the scrubbing liquid is thereby desulphitized on a batch basis.

2. In a method according to claim 1, the improvement comprising sensing the pH of the recycled scrubbing liquid, and interrupting the recycling thereof through the scrubbing tower means from one cycling tank and initiating recycling of desulphitized scrubbing liquid to the scrubbing tower means from another cycling tank responsive to the sensed pH.

3. In the method of claim 1, the improvement further comprising further cooling the exhaust gases after spray scrubbing thereof in said scrubbing tower means, and adsorbing water insoluble pollutants from the thus cooled exhaust gases prior to discharge of the gases to the atmosphere.

4. In the method of claim 1, the improvement comprising cooling the scrubbing liquid by refrigeration thereof in said cycling tanks.

* * * * *